United States Patent Office 3,005,822
Patented Oct. 24, 1961

3,005,822
NEW 1:4-DIHYDROXY-5-ACYLAMINOANTHRA-
QUINONES
Walter Jenny, Basel, Switzerland, assignor to
Ciba Limited, Basel, Switzerland
No Drawing. Filed May 23, 1958, Ser. No. 737,212
Claims priority, application Switzerland May 27, 1957
12 Claims. (Cl. 260—272)

This invention provides as new dyestuffs 1:4-dihydroxy-5-acylaminoanthraquinones of which the acyl radical is the radical of a monocarboxylic acid.

The invention also provides a process for the manufacture of the aforesaid dyestuffs, wherein a 1:4-dihydroxy-5-aminoanthraquinone is acylated with a reactive derivative of a monocarboxylic acid.

As acylating agents there are advantageously used halides of monocarboxylic acids of low molecular weight, for example, of aliphatic monocarboxylic acids containing 2–12, and advantageously 4–12 carbon atoms, for example, the halides of acetic acid, propionic acid, butyric acid, isobutyric acid, caproic acid or lauric acid. Of special interest are the halides of aromatic monocarboxylic acids of the benzene series, especially benzoic acid and substitution products of benzoic acid, for example, salicylic acid, para-hydroxybenzoic acid or para- or meta-methoxybenzoic acid, or alkyl-substituted benzoic acid, such as ortho-, meta- or para-toluylic acid and halogen-substituted benzoic acids, such as ortho-chloro- or ortho-bromobenzoic acid. There may also be mentioned the halides of alicyclic carboxylic acids, for example, cyclohexane carboxylic acid, and heterocyclic acids, for example, furane 2-carboxylic acid or pyridine-3-carboxylic acid.

As halides there are advantageously used the chlorides of the aforesaid acids.

The acylation may be carried out by a method in itself known, for example, in an inert organic solvent, such as nitrobenzene or chlorobenzene, advantageously, in the presence of an acid-binding agent, for example, a tertiary base such as pyridine or dimethyl aniline, and advantageously at a raised temperature.

The 1:4-dihydroxy-5-acylaminoanthraquinones of this invention are excellently suited, especially after a suitable pasting operation which may be coupled with a reprecipitation, for example, from sulfuric acid, for dyeing or printing structures of hydrophobic material, especially fibers of polyesters, for example, polyethylene terephthalate, which fibers are known under the name "Terylene" or "Dacron." Strong pure orange-red dyeings, which are distinguished more especially by their good fastness to light and sublimation, are obtained by the usual dyeing methods, for example, with a dye liquor which contains a dispersion of the dyestuff and advantageously a dispersing agent, at a temperature in the vicinity of 100° C., if desired, with the addition of swelling agent, or at a temperature above 100° C. under superatmospheric pressure. As no dyestuffs for producing orange-red dyeings on polyester fibers of good fastness to light and sublimation have hitherto been known, the dyestuffs of this invention constitute a valuable addition to the art.

The following examples illustrate the invention, the parts being by weight:

*Example 1*

2.55 parts of 5-amino-1:4-dihydroxyanthraquinone are suspended in 40 parts of dry chlorobenzene and, after the addition of 1.8 parts of benzoyl chloride, the mixture is boiled under reflux for 2 hours, allowed to cool and cooled to 5° C., filtered with suction, and the filter residue is washed with chlorobenzene and alcohol and dried. The dyestuff, which is obtained in good yield, crystallises from chlorobenzene in handsome orange-red crystals, which dissolve with a red coloration in concentrated sulfuric acid.

In a state of fine dispersion the dyestuff dyes polyester fibers by the high temperature method or the method using a swelling agent, strong pure orange tints of excellent fastness to light and sublimation.

The 5-amino-1:4-dihydroxyanthraquinone used in this example can be obtained as described in "Journal für praktische Chemie" (2) vol. 130, pages 92–101 (1931) by reacting 5-chloro-1:4-dimethoxyanthraquinone with para-toluene sulfonamide followed by demethylation and the splitting off of the para-toluene sulfonic acid group.

*Example 2*

25.5 parts of 5-amino-quinizarin and 22 parts of 2-chlorobenzoyl chloride are boiled under reflux in 440 parts of dry chlorobenzene for 3 hours under reflux. After being cooled, the mixture is stirred for ½ hour at 0–5° C., then filtered with suction, and the filter residue is washed with chlorobenzene, alcohol and petroleum ether and dried in vacuo at 65–70° C. The dyestuff, which is obtained in very good yield in the form of a red powder, after being brought into fine dispersion, dyes polyester fibers, for example, by the high temperature method, pure orange tints having excellent properties of fastness.

*Example 3*

25.5 parts of 5-amino-quinizarin and 26 parts of 3-trifluoromethyl-benzoyl chloride are boiled under reflux in 390 parts of dry chlorobenzene for 3 hours. After cooling the mixture, it is stirred for one hour at 0–5° C., filtered with suction, and the filter residue is washed with chlorobenzene, alcohol and petroleum ether and dried in vacuo at 65–70° C. The dystuff, which is precipitated as a dark red powder, dyes polyester fibers, for example, by the high temperature method, pure scarlet tints having excellent properties of fastness.

*Example 4*

25.5 parts of 5-amino-quinizarin and 22 parts of 4-methoxy-benzoylchloride are boiled under reflux in 420 parts of dry chlorobenzene for 3 hours. After being cooled, the mixture is stirred for ½ hour at 0–5° C., filtered with suction, and the filter residue is washed with chlorobenzene, alcohol and petroleum ether and dried in vacuo at 65–70° C. The dyestuff, which is precipitated in the form of red crystals, after being brought into fine dispersion, dyes polyester fibers, for example, by the high temperature process, fast pure orange tints.

*Example 5*

25.5 parts of 5-amino-quinizarin and 22 parts of 4-chlorobenzoyl chloride are boiled under reflux in 460 parts of dry chlorobenzene for 3 hours. After cooling the mixture, the red crystals of the dyestuff are filtered off with suction, washed with chlorobenzene, alcohol and petroleum ether and dried in vacuo at 65–70° C. After being brought into fine dispersion, the dyestuff dyes polyester fibers, for example, by the high temperature method, very fast light yellow-red tints.

*Example 6*

25.5 parts of 5-amino-quinizarin and 22 parts of phenoxy-acetylchloride are boiled under reflux in 380 parts of dry chlorobenzene for 3 hours. After cooling the mixture it is stirred for ½ hour at 0–5° C., and the dystuff, which precipitates in the form of a red crystalline powder, is filtered off with suction, washed with chlorobenzene, alcohol and petroleum ether and dried in vacuo at 65–70° C. After being brought into fine dispersion, the dyestuff dyes polyester fibers brilliant orange tints.

*Example 7*

18.4 parts of nicotinic acid are suspended in 400 parts of dry chlorobenzene and, after the addition of 21 parts of thionyl chloride and a small amount of pyridine, the whole is slowly heated to 110° C., while stirring, then stirred for 1½ hours at 110–120° C., cooled to 50° C., and dry air is blown through the mixture for ½ hour. 25.5 parts of 5-amino-quinizarin are then added and the whole is slowly heated to the boil, then boiled under reflux for 3 hours, allowed to cool, filtered with suction at 0–5° C., and the filter residue is washed with chlorobenzene, alcohol and petroleum ether and dried in vacuo at 60° C. The dyestuff is obtained in the form of red crystals which, after being brought into fine dispersion, dye polyester fibers, for example, by the high temperature method, pure orange tints having good properties of fastness.

*Example 8*

1 gram of the dyestuff obtained as described in the first paragraph of Example 1 is pasted with 1.5 grams of sulfite celluloe waste liquor or dinaphthyl-methane disulfonic acid or a fatty alcohol-ethylene hydroxide condensation product, and the mixture is diluted to 4000 cc. with water with the addition of a further 1 cc. per liter of acetic acid of 40% strength and 1 gram per liter of a fatty alcohol-ethylene oxide condensation products. 100 grams of a yarn of polyester fibers are dyed for ½ to 1 hour at 115–132° C. in the dyebath so prepared, and a deep orange dyeing of very good fastness to light is obtained.

What is claimed is:
1. 1,4-dihydroxy-5-acylaminoanthraquinone of the formula

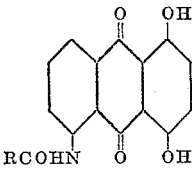

in which R— is an aromatic radical selected from the group consisting of phenyl, pyridyl, hydroxyphenyl, lower alkoxyphenyl, lower alkylphenyl, trifluormethylphenyl, halophenyl and phenoxyacetyl.

2. 1,4-dihydroxy-5-acylaminoanthraquinone of the formula

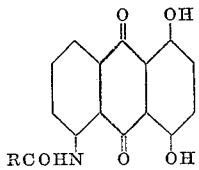

in which R— is hydroxy phenyl.

3. 1,4-dihydroxy-5-acylaminoanthraquinone of the formula

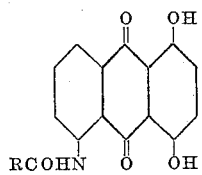

in which R— is methoxyphenyl.

4. 1,4-dihydroxy-5-acylaminoanthraquinone of the formula

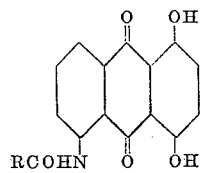

in which R— is methylphenyl.

5. 1,4-dihydroxy-5-acylaminoanthraquinones of the formula

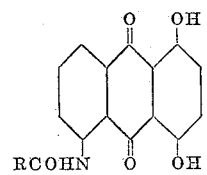

in which R stands for pyridyl.

6. The dyestuff of the formula

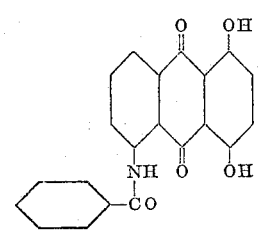

7. The dyestuff of the formula

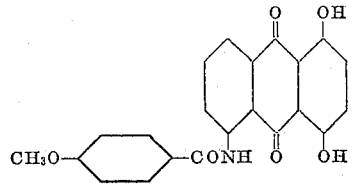

8. The dyestuff of the formula

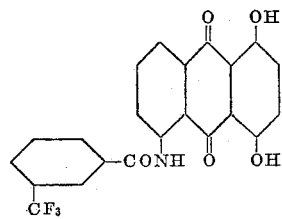

9. The dyestuff of the formula

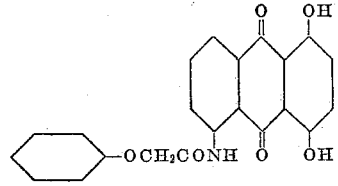

10. The dyestuff of the formula

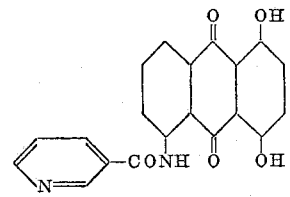

11. 1,4-dihydroxy-5-acylaminoanthraquinone of the formula

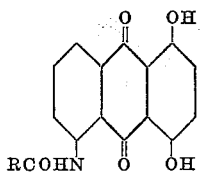

in which R— is trifluormethylphenyl.

12. 1,4-dihydroxy-5-acylaminoanthraquinone of the formula

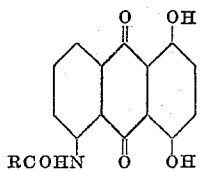

in which R— is halophenyl.

References Cited in the file of this patent

UNITED STATES PATENTS 2,691,027 Grossman _____ Oct. 5, 1954
2,819,288 Grossman _____ Jan. 7, 1958

OTHER REFERENCES

Waldmann: J. Prakt. Chem., vol. 130, pages 92–102 (1931).

Venkataraman: Chem. of Synthetic Dyes, vol. II, pages 881–91 (1952), Academic Press, Inc., N.Y.

American Dyestuff Reporter, July 5, 1954, pages 426–437.

Schroeder et al.: Textile Research Journal, vol. XXVII, No. 4, April 1957, pages 275–285.